United States Patent [19]
Munsell et al.

[11] Patent Number: 5,839,099
[45] Date of Patent: Nov. 17, 1998

[54] SIGNAL CONDITIONING APPARATUS

[75] Inventors: Clyde Stephan Munsell; Albert Russell Schaefer; Rodney Guy Cohen, all of San Diego; John Richard Cover, Burbank, all of Calif.

[73] Assignee: GuVolt, Inc., San Diego, Calif.

[21] Appl. No.: 661,542

[22] Filed: Jun. 11, 1996

[51] Int. Cl.$^6$ ........................................ G10L 3/02
[52] U.S. Cl. ........................................ 704/207; 704/246
[58] Field of Search ........................ 395/2.16, 2.55, 395/2.62, 2.57, 2.33; 704/275, 207, 243, 251, 253, 233, 254, 205, 267, 270, 246

[56] References Cited

U.S. PATENT DOCUMENTS

| | | | |
|---|---|---|---|
| 3,982,070 | 9/1976 | Flanagan | 395/2.67 |
| 4,464,784 | 8/1984 | Agnello | 395/2.16 |
| 4,622,690 | 11/1986 | Smith, III et al. | 395/2.16 |
| 4,661,981 | 4/1987 | Henrickson et al. | 395/2.16 |
| 4,700,391 | 10/1987 | Leslie, Jr. et al. | 395/2.57 |
| 4,792,975 | 12/1988 | MacKay | 395/2.16 |
| 4,833,717 | 5/1989 | Nakamura et al. | 704/206 |
| 5,054,085 | 10/1991 | Meisel et al. | 395/2.16 |
| 5,073,938 | 12/1991 | Galand | 395/2.16 |
| 5,583,965 | 12/1996 | Douma et al. | 704/275 |
| 5,640,490 | 6/1997 | Hansen et al. | 704/254 |

*Primary Examiner*—Richemond Dorvil
*Attorney, Agent, or Firm*—Presseisen & Reidelbach PLC; Charles F. Reidelbach, Jr.

[57] ABSTRACT

An signal conditioning apparatus and method to condition a human voice signal for input to a time-domain voice recognition system. The signal conditioner normalizes sampled human voice inputs so that all inputs result in an output with substantially the same pitch and frequency bandwidth characteristics. The signal conditioner includes a pitch altering circuit that alters the pitch of the input human voice signal and a frequency band limiting circuit that limits the range of spectral information contained in a signal. The pitch altering circuit converts the input into a digital signal at a first conversion rate and converts the digital signal back to an analog signal at a second rate which is unequal to the first rate. The frequency band limit circuit is a plurality of filters at different points in the frequency spectrum.

25 Claims, 2 Drawing Sheets

SIGNAL CONDITIONING APPARATUS

FIELD OF THE INVENTION

The present invention pertains to an apparatus and method for conditioning an audio signal for use in a voice recognition system. More specifically, the present invention pertains to an apparatus and method for sampling and normalizing a human voice for use in a voice recognition system. As such, the present invention avoids the training procedures normally associated with voice recognition systems while preserving the informational content of the human voice.

BACKGROUND OF THE INVENTION

There have been many attempts to develop methods and apparatuses to recognize the human voice. Until recently, very few methods have succeeded in allowing a computer to take the human voice as an input and produce the corresponding text accurately and quickly.

Early in the development of voice recognition systems, there were attempts to analyze language in their basic unit of speech, the phoneme. In the English language there are 40 phonemes. The phonetic analysis consists of reducing a sampled human voice into its constituent phonemes. The succession of phonemes would then be processed by comparing various groupings of the sampled phonemes against predetermined groupings that represented words in the English language. Despite the simplicity of this approach, it was largely abandoned for failing to operate as intended. Those studying this approach were unable to generate a textual string from a sampled human voice.

Recently, another approach to voice recognition has emerged. These systems are characterized by implementing time-domain analysis of the human voice. The human voice can be represented as a signal having a function over a time period. This signal can also be represented as a function over a frequency spectrum. Time-domain analysis involves converting a time based signal to a frequency based signal and then using mathematical algorithms to analyze the frequency information.

These time-domain systems, such as the Dragon Dictate system, consider the sampled human voice, or utterance, as a pattern of acoustic information across frequency changes over time. The information in the utterance is analyzed by carrying out fast Fourier transforms on the spectro-temporal information in the utterances. Until recently, the cost to computationally analyze this information was prohibitive because only mainframe computers possessed the power to perform these calculations in a real-time or even in near real time. However, the development of the personal computer and the continual increase in processor speed has made the microcomputer implementation of systems like Dragon Dictate possible. Accordingly, with the correct equipment, nearly any microprocessor based computer has the capability to act as a voice recognition system.

The major disadvantage in the time-domain analysis methods is that they are systemically speaker dependent. The algorithms developed for this style of voice recognition system are designed to analyze and recognize individual utterances. As each person's speech patterns are different, it is likely that each person will say a particular phrase differently. To a voice recognition system, these utterances of the same phrase will appear to be distinct acoustical patterns.

In order to improve accuracy, the producers of time-domain voice recognition systems have designed systems to sense broad frequency ranges. Because the added spectral information also contains the speakers unique speech patterns, that added spectral information compounds the distinctions between the utterances of two speakers saying the same phrase. Therefore, it has become generally recognized that each voice recognition system must be trained to recognize the voice patterns of a each speaker who is a user of that voice recognition system. The training process can be a time consuming process and must be repeated for every separate computer acting as a voice recognition system that the user intends to use. It is generally recognized that the more training in which a user engages, the more accurate the voice recognition system will perform. However, with the basic training usually lasting 30 minutes of more, it is often inefficient and uneconomical.

Therefore, it would be advantageous to have a signal conditioner operating with a voice recognition system so that the voice recognition system would have the accuracy of a highly trained voice recognition system operating without a signal conditioner.

It would be advantageous to have a signal conditioner operating with a voice recognition system so that the voice recognition system does not need to be trained to recognize each individual user and is, therefore, user independent.

It would be advantageous to have a signal conditioner operating with a voice recognition system that can be implemented in a microcomputer.

SUMMARY OF THE INVENTION

It is an objective of the present invention to provide a signal conditioning device which normalizes frequency bandwidth and pitch characteristics of many different human voices so that the output of the signal conditioner is spectrally uniform or normal irrespective of the input.

It is another objective of the present invention to provide a signal conditioning apparatus which will allow a time-domain voice recognition device to operated user independent.

It is yet another objective of the present invention to provide a signal conditioning apparatus which will be implemented with a time-domain voice recognition system which minimizes or eliminates the need for voice training by the users of the voice recognition system.

It is a further objective of the present invention to provide a signal conditioning apparatus that is implemented to be operable with a microcomputer running a time-domain voice recognition system.

In accordance with the present invention, a signal conditioning apparatus is provided that receives a human voice input from either a transducer, such a microphone, or a reproduction of a human voice such as the playback of a previously recorded human voice. The human voice input is applied to a pitch altering circuit which modifies the predominant or average frequency of the human voice input to a lower or high pitch. The pitch altering circuit consists of an analog to digital converter having a first conversion rate and producing a bit stream. The pitch altering circuit also includes a digital to analog converter which receives the bit stream and has a second conversion rate for producing an intermediate output. The intermediate output is applied to a frequency bandpass limiting circuit. The frequency bandpass limiting circuit consists of a low bandpass filter and a high bandpass filter which both simultaneously receive the intermediate output. The outputs of these filters are applied to a mixer that combines the two outputs to produce an output which is bandwidth limited as compare to the human voice input. The output of the mixer is also the output of the signal conditioning device has the quality that it is normalized. In other words, the output of the signal conditioning device possesses uniform acoustic qualities irregardless of the human voice input. The output of the signal conditioning device is provided to a time-domain voice recognition system.

Time-domain voice recognition systems, such as the Dragon Dictate system, requires that a user train the system before using the voice recognition system. This training process typically involves the user uttering a predetermined series of phrases so that the voice recognition system becomes familiar with the user's particular speech pattern. The training process results in the creation of a data file that contains the information needed to correctly interpret a particular user's speech patterns. As the output of the present invention is normalized or uniform irrespective of the human voice input, the training process is actually performed once during fabrication and the resultant data file is reproduced for each signal conditioning device distributed. Proper use of the present invention merely requires that this data file be available for the voice recognition system.

These and other features and objects of the present invention will be apparent to those skilled in the art from the following detailed description, taken together with the accompanying drawings, in which:

DETAILED DESCRIPTION OF THE PREFERRED EMBODIMENT

Figure 1:
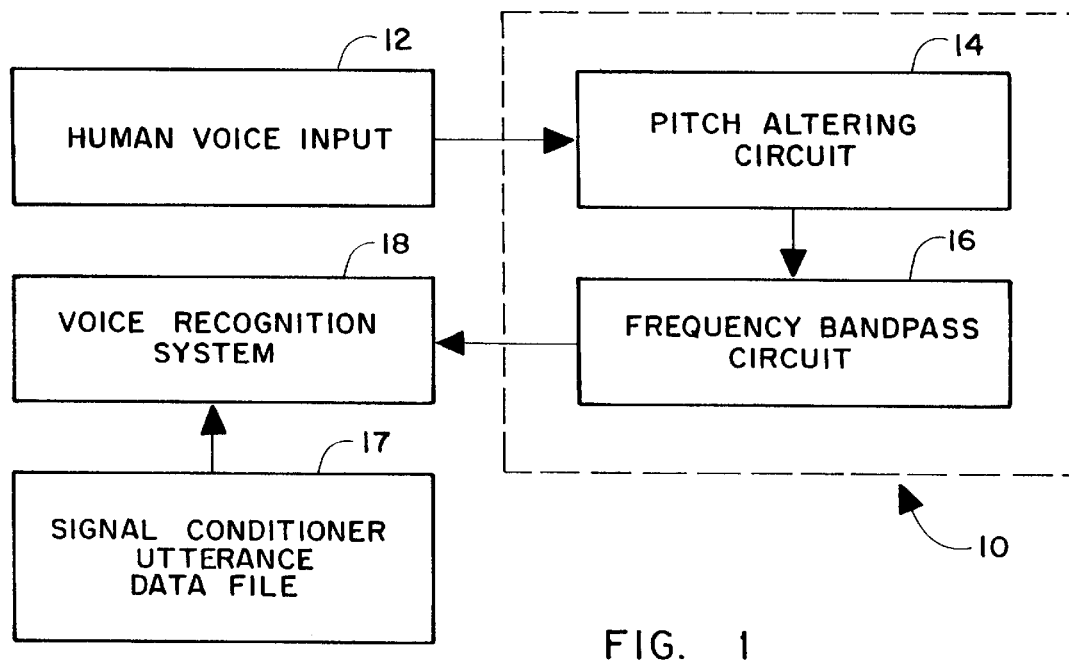
FIG. 1 is a block diagram and overview of the present invention.

An apparatus for carrying out the present invention is illustrated in FIG. 1 and generally referred to as a signal conditioner 10. The signal conditioner 10 consist of two major components: pitch altering circuit 14 and frequency bandpass circuit 16.

The signal conditioner 10 applies a human voice input 12 to a pitch altering circuit 14. The output of pitch altering circuit 14 is applied to frequency bandpass circuit 16. Although not shown, the human voice input 12 could be first applied to frequency bandpass circuit 16 and the output of frequency bandpass circuit 16 could be applied to pitch altering circuit 14.

The overall output of signal conditioner 10 is applied to a time-domain voice recognition system 18, such as the Dragon Dictate system. A data file 17 created in a format readable by the voice recognition system, containing the information needed to interpret the output of the signal conditioner 10 is provided. The data file is in the format of a user's training data that is normally created by a user prior to operation of the voice recognition system. In this particular case, data file 17 contains the information necessary for the voice recognition system to interpret the output of the signal conditioner 10. As the output of signal conditioner 10 is spectrally normal or uniform irregardless of the input, this data file can be produced once during fabrication and copied for each signal conditioner 10 being used in conjunction with a voice recognition system 18.

Figure 2:
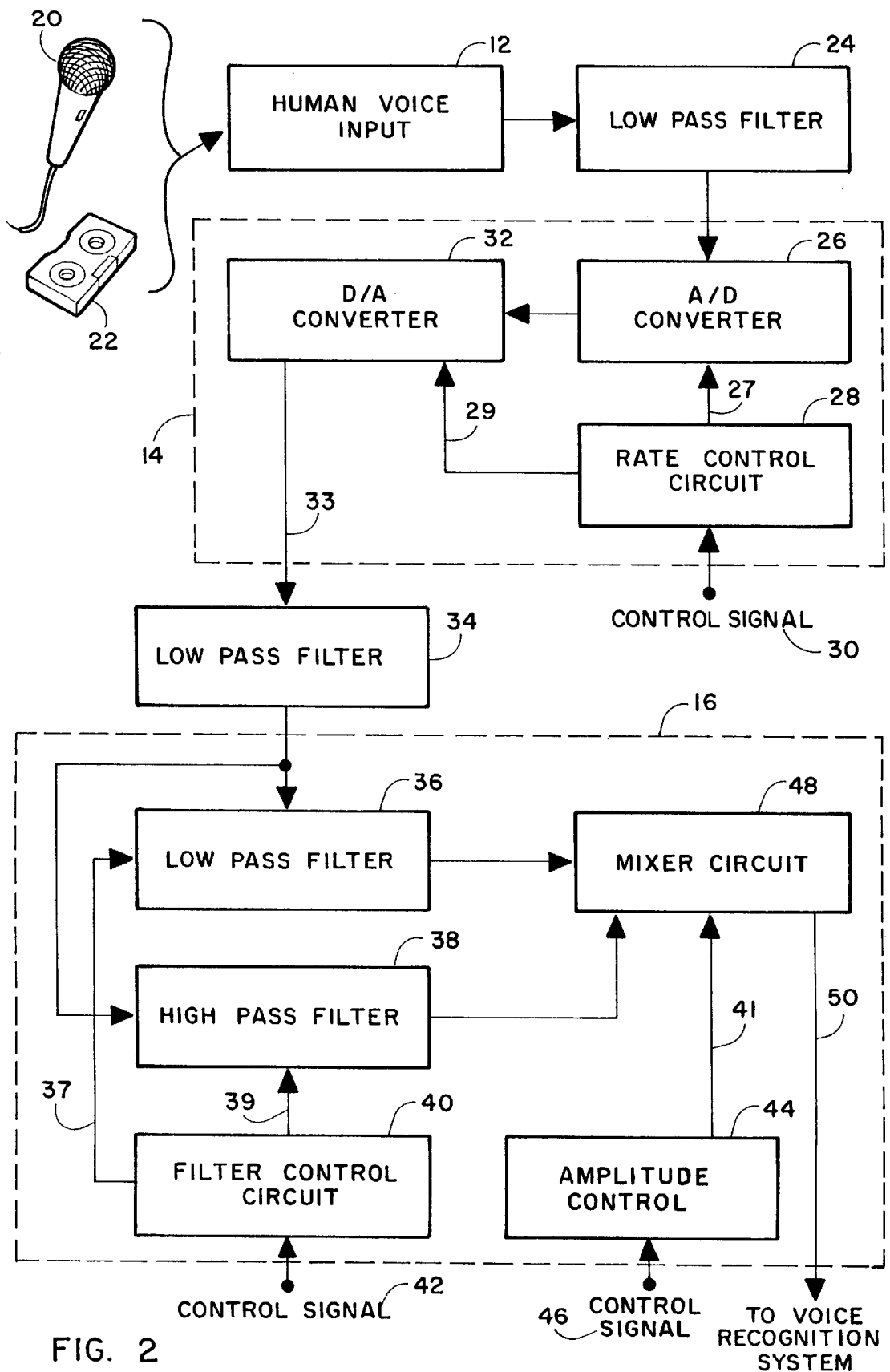
FIG. 2 is a block diagram of the preferred embodiment of the present invention.

Turning now to FIG. 2, a more detailed block diagram of the signal conditioner 10 is shown. The human voice input 12 can be produced by any well known means such as a microphone 20 or a cassette tape 22. The cassette tape 22 is preferably pre-recorded and can be played back utilizing a device such as a tape recorder (not shown). While not illustrated, the human voice input 12 can also be captured from a telephone. Specifically, a user could use a telephone to call the device implementing the signal conditioner 10 and provide the input from the remote telephone location. As it will later be discussed, the device implementing the signal conditioner is preferably a microcomputer. Accordingly, as modems being used in conjunction with microcomputers are well known, the use of a remote telephone to provide the human voice input 12 to the signal conditioner 10 is contemplated.

Although not necessary for the present invention, a low pass band filter 24 is provided to eliminate any noise from the human voice input 12. This low band pass filter 24 is well known in the art. The output of low pass filter is applied to the pitch altering circuit 14.

The pitch altering circuitry 14 is identified by a dotted line and has three primary components: an analog to digital (A/D) converter 26, a rate control circuit 28, and digital to analog (D/A) converter 32. The pitch altering circuit 14 can be implemented as one integrated device by any well known means, such as OKI semiconductor MSM6722. However, it is equally possible to construct the pitch control circuit 14 from well known discrete elements.

The filtered human voice is applied to the A/D converter 26. The rate of conversion of the filtered human voice from an analog signal to a digital signal by A/D converter 26 is controlled by the rate control circuit 28. It is well known in the art, the rate of conversion must be greater than twice the frequency range of the signal being converted from an analog format to a digital format. As the signal being converted is a human voice, well known to have frequency range of 60 Hz to 400 Hz, the rate of conversion must be greater than 800 Hz. In the preferred embodiment, the rate control circuit can be constructed from one of many well know discrete elements. For instance, a 4.0 mega Hz crystal oscillator, such as that produced by Murata Manufacturing Corporation, part no. CSA4.00MG or Kycoera Corporation, part no. KBR-4.0 MSA can be used as the central timing element. As needed, the rate control circuitry will divide down the 4.0 mega Hertz signal based on a rate control signal 30. This can be implemented by digital counter circuits which are well known in the art. In one embodiment, the rate control circuit produces a fixed predetermined first rate control signal 27 for the A/D converter. In this embodiment, control signal 30 is fixed at the time of fabrication of the present invention. The predetermined signal can be in the range of 4.40 kHertz to 16.6 kHertz and preferably, the sampling rate is 8.33 kHertz. In another embodiment, the control signal 30 is varied by a software routine running in the voice recognition system or software running in conjunction with the voice recognition system. The control signal 30 is altered based upon a perceived error rate in the voice recognition system operation as determined by the software. Accordingly, the alteration of control signal 30 is intended to reduce the perceived error rate by varying the first rate control signal 27.

The output of A/D converter 26 is applied to the D/A converter 32. This output can be a bit stream having packets of a fixed bit number (sequential transmission) or a bus line having a number of connections wherein each connection represents a bit of a packet (parallel transmission). The D/A converter 32 can be selected from many discrete circuits well known in the art. The rate of reconstruction of the digital signal into an analog signal is controlled by rate control circuit 28 by a second rate control signal 29. In one embodiment the second rate control signal 29 can be determined at the time of fabrication and accordingly, is fixed. In another embodiment, the second rate control signal 29 can be varied in a range of 4.4 kHertz to 16.6 kHertz. While not shown, the second rate control signal 29 is altered by the voice recognition system or software operating in conjunction with the voice recognition system. The variation of second control rate signal 29 is accomplished by analyzing the human voice input. It is a well established fact that an adult male voice has an average frequency of 100 Hz whereas an adult female voice has an average frequency of 180 Hz. In one embodiment, the pitch altering circuitry 14 produces an output 33 having an average or predominant frequency that is at some intermediate value between the adult male and adult female average frequency. In another embodiment, the pitch altering circuitry 14 produces an output that has a predominant frequency of either an the adult male or the adult female. Thus, if the voice recognition requires a lower pitched human voice input, the second control signal will range from 4.40 kHertz to 8.33 kHertz. Conversely, should the voice recognition system require a higher pitched human voice, the second control signal will range from 8.33 kHertz to 16.6 kHertz.

The output 33 of D/A converter 32 is a human voice signal wherein the pitch has been altered by applying different first and second rate control signals. Ultimately, it is the difference between the first and the second rate control signals that causes the pitch variation. To wit, if a second rate control signal 29 is applied to D/A converter and that second rate control signal 29 is of a higher frequency than the first rate control signal 27, the pitch of the resulting digital reconstruction output 33 will be higher than human voice input 12. Similarly, if a second rate control signal is applied to D/A converter and that second rate control signal is of a lower frequency than the first rate control signal 27, the pitch of the resulting digital reconstruction output 33 will be lower than human voice input 12.

Although not necessary for the present invention, a low pass band filter 34 is provided to eliminate any noise added by pitch altering circuit 14. This low band pass filter 34 can be selected from any device well known in the art. The low pass filter 34 is intended to eliminate high frequency disturbances resulting from the use of the A/D converter 26 and D/A converter 32.

The resulting digital reconstruction output 33 is then applied to a frequency bandpass circuit 16 and includes: a low pass filter 36, a high pass filter 38, a mixer circuit 48, a filter control circuit 46, and an amplitude control circuit 44. As is well known in the art, single semiconductors implementing these elements are well known in the art, such as the National Semiconductor LM1035. However, it is also possible to construct the frequency bandwidth limiting circuitry 13 from discrete components.

The output of low pass filter 34 is simultaneously applied to low pass filter 36 and high pass filter 38. The low pass filter 36 is distinct from low pass filter 34 in that low pass filter 36 can be a notch filter. Generally, the low pass filter 36 allows transmission of signals with a predominant frequency of 20 Hertz to a predominant frequency of 60 Hertz. In the preferred embodiment, the low pass filter allows transmission of a predominant frequency of 40 Hertz.

Similarly, the high pass filter 38 can be a notch filter that allows transmission of signals with a predominant frequency of 14 kHertz to a predominant frequency of 18 kHertz to pass. In the preferred embodiment, the high pass filter 38 allows transmission of signals with a predominant frequency of 16 kHertz.

The filter control circuit 40 controls the frequency range of the low pass filter 36 and high pass filter 39 by control signals 37, 39. In one embodiment, the control signals 37, 39 are predetermined and fixed at the time of fabrication of the signal conditioning device 10. As is well known in the art, the fixed control signal can be establish by well known resistor-capacitor circuits or a potentiometer set at fabrication.

In another embodiment, the control signals 37, 39 produced by the filter control circuit 40 can varying during the operation of the signal conditioning device 10. In this embodiment, the voice recognition system or software operating in conjunction with the voice recognition software generates a control signal 42 that alters the filter control circuit 40 and which in turn alters control signals 37, 39. Specifically, this software implemented with the voice recognition system or software running in conjunction with the voice recognition system determines that better operating performance of the voice recognition system would be achieved with the alteration of the frequency ranges of low pass filter 36 and high pass filter 38. Accordingly, the voice recognition system produces control signal 42 that affects the filters. The variable filter control circuit can be accomplished by many well known means, such as control signal 42 can be connected to a transistor which variably controls the resistance in a resistor capacitor circuit. Accordingly, the variable resistance affects the filter or control signal 42 and can be connected to a potentiometer that affects the filters.

The output of the low pass filter 36 and high pass filter 38 are combined in mixer circuit 48. The mixer circuit can be selected from one of many devices well known in the art. The gain of the respective signals from low pass filter 36 and high pass filter 38 are controlled by amplitude control circuit 44. As with the filter control circuit 40, the amplitude control circuit 44 can be predetermined at the time of fabrication of signal conditioning device 10 or the voice recognition system can produce a control signal 46 to alter the respective gains of the outputs of low pass filter 36 and high pass filter 38 in order to optimize performance. As a result, a conditioned human voice output 50 is produced as the output of the mixer circuit. The conditioned human voice output 50 is spectrally normalized so that irregardless of the human voice input 12, the human voice output 50 always has substantially the same pitch and frequency characteristics.

Figure 3:
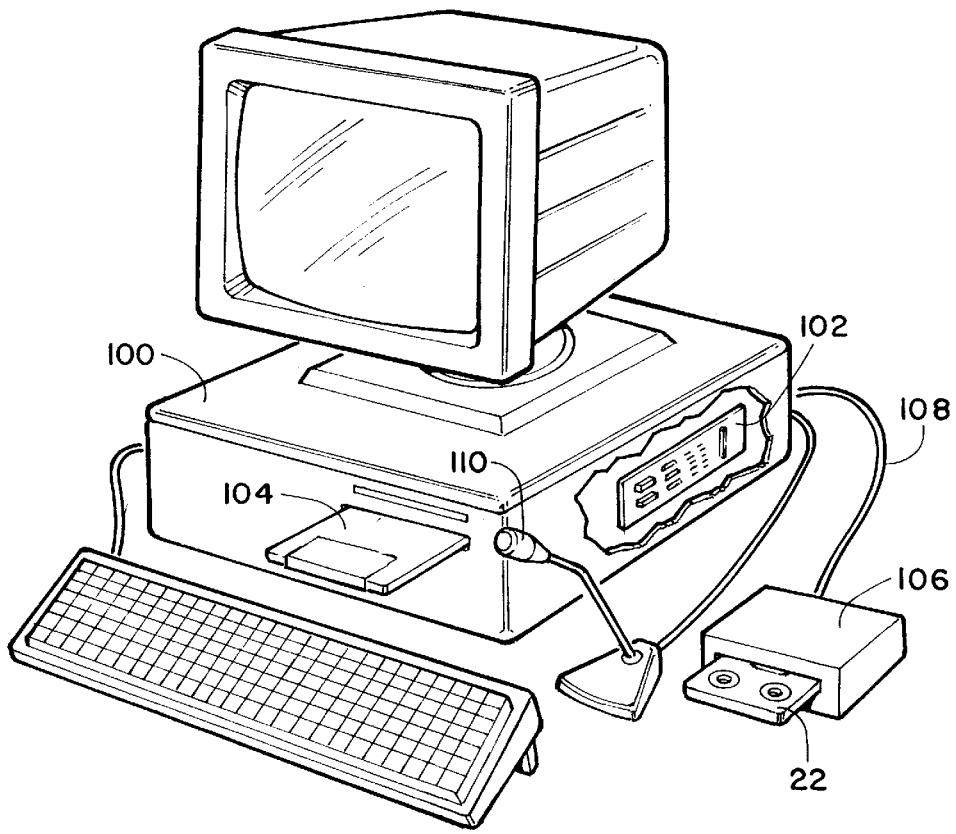
FIG. 3 is an illustration of the present invention in conjunction with a micro computer.

Turning now to FIG. 3, a demonstrative embodiment of the present invention is shown. In this embodiment, the signal condition device 10 is implemented in conjunction with a microcomputer 100 and is embodied in a printed circuit card 102 for placement into one of the many ports of microcomputer 100. The human voice input 12 can be obtained from computer tape cartridge 104 which fits into one of the many style of computer tape drive that are compatible with most microcomputers 100. The human voice input can also be provided from a playback device, such as micro tape recorder 106 playing back tape 22 and communicating with printed circuit board over connection 108. Additionally, micro tape recorder 106 could also be a Phillips style tape playback recorder. Finally, human voice input 12 could be provided by microphone 110 that is normally provided with many microcomputers 100.

While this particular apparatus as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. An apparatus for producing a spectrally normalized human voice signal from a human voice input, said spectrally normalized human voice signal being sent to a voice recognition system, said apparatus comprising:
   a pitch altering circuit receiving said human voice input and producing an intermediate analog output;
   a frequency bandwidth limiting circuit receiving said intermediate analog output and producing said spectrally normalized human voice signal; and
   a means for receiving a control signal from the voice recognition system to control a characteristic of said normalized human voice signal.

2. The apparatus of claim 1 wherein said pitch altering circuit further comprises:
   an analog to digital converter having a first conversion rate, said analog to digital converter receiving said human voice input and producing a bit stream; and
   a digital to analog converter receiving said bit stream and producing said intermediate output, said digital to analog converter having a second conversion rate, said second conversion rate unequal respective to said first conversion rate, thereby altering the pitch of said intermediate output respective to said human voice input.

3. The apparatus of claim 2 further comprising a rate control circuit for determining said first conversion rate and said second conversion rate.

4. The apparatus of claim 3 wherein said second conversion rate is a variable second conversion rate.

5. The apparatus of claim 2 wherein said second conversion rate is a fixed second conversion rate.

6. The apparatus of claim 1 wherein said frequency bandwidth limiting circuit further comprises:
   a low frequency bandpass filter having a first frequency range, said low frequency bandpass filter receiving said intermediate output and producing a low frequency signal;
   a high frequency bandpass filter having a second frequency range, said high frequency bandpass filter receiving said intermediate output and producing a high frequency signal; and
   a mixer circuit for combining said low frequency signal and said high frequency signal to produce said spectrally normalized human voice signal having a narrowed frequency bandwidth.

7. The apparatus of claim 6 wherein said low frequency bandpass filter has a predominant frequency range between 20 Hertz and 60 Hertz.

8. The apparatus of claim 6 wherein said high frequency bandpass filter has a predominant frequency range between 14,000 Hertz and 18,000 Hertz.

9. The apparatus of claim 6 wherein said low frequency bandpass filter has a predominant frequency range of 40 Hertz.

10. The apparatus of claim 6 wherein said high frequency bandpass filter has a predominant frequency range of 16,000 Hertz.

11. The apparatus of claim 6 further comprising:
    a first predetermined control signal for setting said first frequency range; and
    a second predetermined control signal for setting said second frequency range.

12. The apparatus of claim 6 further comprising:
    a first variable control signal for selecting said first frequency range; and
    a second variable control signal for selecting said second frequency range.

13. The apparatus of claim 6 further comprising:
    an amplitude control signal for controlling amplitude of said conditioned human voice signal.

14. A method for producing a conditioned human voice signal for input to a voice recognition system, said method comprising the steps of:
    converting a human voice input to an audio signal, said audio signal having a pitch characteristic and a frequency bandwidth characteristic;
    altering said pitch characteristic of said audio signal;
    narrowing said frequency bandwidth characteristic of said audio signal to produce said conditioned human voice signal; and
    receiving a signal from the voice recognition system to control a characteristic of the audio signal.

15. The method of claim 14 wherein said pitch characteristic is a first pitch characteristic and the step of altering said first pitch further comprises the steps of:
    converting said audio signal to a digital signal, said digital signal comprising a plurality of bits, said plurality of bits produced at a first rate; and
    converting said plurality of bits to an analog signal having a second pitch, said analog signal produced at a second rate, said second rate unequal respective to said first rate thereby said second pitch characteristic being unequal to said first pitch characteristic.

16. The method of claim 15 wherein the step of narrowing said frequency bandwidth characteristic further comprises the steps of:
    filtering said analog signal to produce a low frequency signal;
    filtering said analog signal to produce a high frequency signal; and
    combining said low frequency signal and said high frequency signal to produce said conditioned human voice signal with limited frequency bandwidth characteristic.

17. The method of claim 16 wherein the step of filtering said analog signal to produce said low frequency signal, said low frequency signal having a predominant frequency range between 20 Hertz and 60 Hertz.

18. The method of claim 16 wherein the step of filtering said analog signal to produce said high frequency signal, said high frequency signal having a predominant frequency range between 14,000 Hertz and 18,000 Hertz.

19. The method of claim 16 wherein the step of filtering said analog signal to produce said low frequency signal, said low frequency having a predominant frequency range of 40 Hertz.

20. The method of claim 16 wherein said step of filtering said analog signal to produce said high frequency signal, said high frequency signal having a predominant range of 16,000 Hertz.

21. The method of claim 15 wherein said second rate is predetermined.

22. The method of claim 15 wherein said second rate is variable.

23. An apparatus for normalizing a human voice signal for input into a voice recognition system, said apparatus comprising:

an input device receiving said human voice input and producing a first intermediate analog signal;

a pitch altering circuit receiving said first intermediate analog signal and producing a second intermediate analog signal;

a frequency bandwidth limiting circuit receiving said second intermediate analog signal and producing said normalized human voice signal for input to said voice recognition system; and a means for receiving a control signal from said voice recognition system to control a characteristic of said normalized human voice signal.

24. The apparatus of claim 23 wherein said input device is a microphone.

25. The apparatus of claim 23 wherein said input device is a playback device.

* * * * *